United States Patent [19]

Tack et al.

[11] 4,399,165
[45] Aug. 16, 1983

[54] FRYING OIL COMPOSITION AND PROCESS OF PRODUCTION

[75] Inventors: André A. Tack, Izegem; Albert J. Dijkstra, Kortrijk, both of Belgium

[73] Assignee: SAFINCO n.v., Kortrijk, Belgium

[21] Appl. No.: 290,201

[22] Filed: Aug. 5, 1981

[30] Foreign Application Priority Data

Aug. 5, 1980 [GB] United Kingdom ............... 8025519

[51] Int. Cl.$^3$ .......................... A23D 5/00; A23D 5/02
[52] U.S. Cl. ..................................... 426/613; 426/606
[58] Field of Search ........................ 426/601, 613, 606

[56] References Cited

U.S. PATENT DOCUMENTS 4,044,168  8/1977  Steenhoek et al. ................ 426/613
4,140,810  2/1979  van Dam et al. .................. 426/613
4,148,930  4/1979  Duin et al. ...................... 426/613 X
4,169,901  10/1979  Kravis ........................... 426/613 X

FOREIGN PATENT DOCUMENTS 1382214  1/1975  United Kingdom ............... 426/601

Primary Examiner—Robert A. Yoncoskie
Attorney, Agent, or Firm—Cushman, Darby & Cushman

[57] ABSTRACT

An edible oil composition suitable for frying uses is described. The composition comprises
(a) a liquid oil,
(b) an emulsifier,
(c) a browning substance, and
(d) an effective amount of a stabilizing material.

The stabilizing material forms 1% or less of the total weight of the composition and is selected from fully or partly hardened fats or oils with a slip melting point of at least 45° C. The composition has good storage stability, avoids unpleasant spattering and provides excellent tasting and stable sauces after frying and mixing with water.

7 Claims, No Drawings

FRYING OIL COMPOSITION AND PROCESS OF PRODUCTION

This invention relates to edible oils in which certain additives are provided, which aid their usefulness in frying applications. It also relates to processes of producing such oils.

Traditionally butter, margarine and solid or liquid fats or oils are used for frying purposes. Compared with simple fats or oils, butter and margarine have advantages in that non-fatty, proteinaceous materials, synthetic or natural emulsifiers and flavours are present in the product. This confers two properties: the proteins brown on heating and provide useful colouring and flavouring material, and secondly, the emulsifiers assist in the subsequent formation of sauces, which are essentially oil in water emulsions.

The use of butter or margarine, however, has two disadvantages. Being comparatively high melting, the part melted material begins to brown while there is still unmelted material present, producing a risk of burning and secondly, a substantial percentage of butter and margarine is water, which must be boiled off before frying commences properly.

Liquid margarines with low solid fat content have been proposed to overcome the first-mentioned problem. Such liquid margarines are difficult to prepare in a form whereby the emulsion remains stable on storage. German DE-AS No. 21 56 121 proposes a special emulsifier made from a polycondensed hydroxy-acid. U.S. Pat. No. 3,338,720 and corresponding British Pat. No. 1 092 236 propose the inclusion of a hard fat having a titer in the range of 50-65° C. However, such compositions do not eliminate the water present in margarines, which, when used for frying, gives rise to unpleasant spattering as the water is boiling off and wastes energy in so doing.

A semi-solid frying product is described in Netherlands Pat. No. 135 824 (corresponding to British Pat. No. 1 023 341 and U.S. Pat. No. 3,271,166). A fat-blend (20% groundnut oil, 30% palm oil, 10% coconut oil and 40% partially hardened whale oil of slip point 37° C.) is mixed with whey powder, lecithin and flavours. This product is, however, solid and contains a high proportion of saturated fatty acids. Moreover, for dietary reasons a low content of saturated fatty acids, a high content of linoleic acid and the absence of trans isomers would be preferable.

Finally, in U.S. Pat. No. 3,472,661 a stable liquid margarine is described, comprising a fat base which is subsequently mixed with a conventional aqueous phase. The fat base comprises a liquid oil, an emulsifier, a vegetable phosphatide and a thickening agent. The said thickening agent is a high melting edible fat used in an amount of 1.5 to 5% by weight of the total fat base and is used to aid emulsion stability in the finished margarine.

In view of the various proposals discussed above, it is surprising that there has not been described a liquid oil frying product which can perform the several functions of traditional frying materials. Attempts simply to add browning ingredients and emulsifiers to oils fail because of compatibility problems and phase differences which cause problems in preparation, storage and use. We have now surprisingly found that a low water content frying oil product can be prepared which has emulsification and browning properties provided that certain stabilizing agents are added to the composition.

By "emulsification properties", we mean the ability to form oil in water emulsions, not necessarily, but preferably of reasonable stability in a gravy or sauce making process.

By "low water content" we mean products not of the margarine type, i.e. substantially water free.

By "stabilizing" we mean the ability to prevent, or at least reduce, the tendency of various ingredients to separate. Ingredients should remain in suspension to the extent of giving a product which in normal commercial handling remains visually uniform.

The present invention provides an edible oil composition suitable for frying uses, comprising:
(a) a liquid oil
(b) an emulsifier
(c) a browning substance
(d) an effective amount of stabilizing material, forming 1% or less of the total weight of the composition, said stabilizing material being selected from fully or partly hardened fats or oils with a slip melting point of at least 45° C.

Preferably the slip melting point of the suspension stabilizer is at least 55° C.

Particularly effective stabilizing materials have been found to be hardened rape seed oil, hardened fish oil, hardened groundnut oil, (not quite fully) hardened sunflower oil and certain high melting fats obtained by fractionation, or mixtures thereof.

Examples of suitable base oils for the product according to the invention are sunflower oil and corn oil which may be winterized or not, safflower oil, grapeseed oil, soy bean oil which may be selectively hydrogenated to reduce its linolenic acid content and subsequently winterized, olive oil, groundnut oil or cottonseed oil or mixture thereof. The base oils to be used for the product should be properly refined and have a bland and neutral taste and flavour.

Suitable emulsifiers are those emulsifiers commonly used in edible oil in water emulsions such as monoglycerides, lecithin, citric acid esters, tartaric acid esters, lactic acid esters and other emulsifiers as permitted by law, and preferably mixtures thereof.

The amounts of emulsifiers to be used are typically 0.2% to 2% by weight, preferably 0.25% to 1.0%.

Examples of browning substances are milkpowder, either defatted or not, whey powder or even dried buttermilk. For a vegetarian frying oil compositon a vegetable protein for instance derived from soy beans can be used as browning substance. Suitable amounts of browning substance are 0.1% to 1.5% by weight preferably 0.25% to 0.75%.

A number of optional additives can be used to enhance the usefulness of the frying oil composition. These include: salt, flavours, colouring matter (such as annatto or $\beta$-carotene), vitamins and anti-oxidants if legally permitted.

A general procedure for producing frying oil compositions according to the invention comprises
(a) dissolving the emulsifier(s) and the suspension stabilizer in (an aliquot of) the base oil at a temperature that is sufficiently high to ensure complete dissolution,
(b) dispersing the browning substance and other minor ingredients such as salt and flavours in (an aliquot of) the base oil, (c) rapidly cooling the mixture to below ambient temperature.

In one mode of operation the total amount of base oil is heated to a temperature at which the emulsifier(s) and the suspension stabilizer are fully dissolved and the browning substance and minor ingredients are mixed in this solution whereafter the entire mixture is passed through a scraped wall heat exchanger (Votator) that chills the mixture to below ambient temperature. In case the mixing of the browning substance has caused air to be entrained in the mixture this may be degassed by conventional means either after having been chill-cooled but preferably prior to being pumped through the Votator.

A more expedient mode of operation entails dissolving the emulsifiers and the stabilizer in a small portion, for instance 10% of the base oil, mixing the browning substance in this solution or in another small portion of the oil, degassing these portions if so desired and mixing these portions with the remainder of the base oil that is only moderately heated and then passing the mixture through the Votator unit.

A further mode of operation entails adding the oil portion in which the emulsifiers, the stabilizer, the browning substance and flavours have been mixed to the remainder of the base oil whereby this remainder of the base oil has been lowered in temperature prior to the addition of the aforementioned pre-mix. In order to ensure the rapid cooling of the pre-mix, vigorous agitation during this addition is necessary using for instance a homogenizer type of mixing device.

A number of variants of the general procedure outlined above present themselves to those skilled in the art. The flavours may of course be dissolved together with the other fat soluble ingredients and need not necessarily be added together with the browning substance. The browning substance itself may be combined with the flavours, for instance by spray drying a solution of salt, flavours and proteinaceous materials, to which spray dried product further proteinaceous materials may be added if so desired.

The invention if further illustrated by the following examples:

EXAMPLE 1

A low water content frying oil was prepared by dissolving as stabilizing material 0.25 kg fully hydrogenated groundnut oil (slip melting point 62° C., iodine value less than 1) in 33 kg fully refined liquid groundnut oil, by heating to 70° C. to ensure complete dissolution. The percentage of stabilizing material was thus 0.75% by weight. An amount of 0.1 kg 40% α-monoglycerides and 0.1 kg soy lecithin were added and dissolved.

Subsequently, the temperature was lowered to 50° C. and 0.5 kg of a spray dried mixture (50% skimmed milk powder, 36% salt and 14% flavour compounds) were dispersed in the warm oil mixture. Some minor constituents consisting of colouring agents, vitamins and further fat soluble flavours were added.

The warm mixture was then fed by means of a gear-pump to a scraped surface tubular cooler (Schroeder Versuchskombinator Type VWK 60/400) at a rate of 50 kg per hour. The outlet temperature was 5° C. Subsequently, the product was passed through a B-unit where it was worked mechanically. The resulting liquid frying oil composition was stored in 250 ml clear glass bottles at ambient temperature or in a household refrigerator. The frying oil was subsequently assessed with respect to its stability and its frying performance. The suspension stability of the oil was judged by looking at the neck of the bottle for separation: a poor stability manifests itself by the appearance of a clear oil layer below the surface which layer grows with time. The frying properties were assessed by heating 50 g of the frying oil in a stainless steel frying pan of 19 cm diameter on a gas ring from room temperature up to a temperature of 175° C. The flavour of the oil was judged after it had cooled down and the appearance of the browning substance was judged. To assess the sauce made from the frying oil, the hot oil was mixed with 100 ml of cold tap water and heated to almost boiling point. The sauce thus obtained was transferred to a 250 ml measuring cylinder and judged for stability from the amount of water separating at the bottom of the cylinder. The taste of the gravy was assessed by a panel. In a second frying experiment 125 g lean beef was fried and the spattering of the oil was determined by counting the number of spots on a piece of paper suspended 25 cm above the frying pan while the meat was being fried on both sides. Again, the resulting gravy was assessed organoleptically by a taste panel.

The frying oil produced as described above did not reveal an oily collar during the first week of storage at room temperature. When placed in the refrigerator, the frying oil partly solidified but after having been allowed to reach room temperature again, it became again pourable and completely uniform in appearance. The taste of the oil after having been heated and of the sauce was judged to be pleasant and free from an oily taste. The browning substance was fairly fine in appearance. Only 8 spots were observed on the piece of paper hung above the pan during the frying of the meat.

In this experiment not the entire mixture was pumped through the Votator unit and what was left over was allowed to cool down to room temperature. Instead of a stable suspension as attained by the rapid cooling process, both the browning substance and the stabilizing material settled at the bottom of the container as a sediment in an otherwise clear oil, thus indicating the necessity of the rapid cooling process.

EXAMPLE 2

Whereas Example 1 gives a single oil composition based upon groundnut oil, the present example illustrates a single oil composition based upon sunflower oil. The process for preparing the frying oil composition is the same as described under Example 1 but instead of fully hardened groundnut oil 0.3 kg of partially hydrogenated sunflower oil (slip melting point 56° C., iodine value 40) was mixed with 33 kg of fully refined and winterized sunflower oil of a linoleic acid content of 67%. The resultant content of stabilizing material was 0.9 wt%. The resulting frying oil could easily be poured out of its glass bottle over the entire temperature range of 5–25° C. and because of its high linoleic acid content it conforms to all nutritional values commonly ascribed to sunflower oil. The stability of the oil was again very good in that no oily collar was noticeable after one week of storage at ambient temperature. Other characteristics assessed were very similar to those observed on the frying oil described under Example 1.

EXAMPLE 3

Frying oils according to the present invention need not necessarily be single oil products or solely based upon vegetable oils. Thus, employing the process described in Example 1 and using 0.20 kg fully hardened fish oil (slip melting point 56° C., iodine value less than 1), 20 kg of fully refined sunflower oil and 13 kg of a fully refined palmolein fraction (cloud point 7° C.) and thus having a stabilizing material content of 0.6 wt%, a frying oil resulted that showed excellent suspension stability: after three weeks storage at ambient temperature no oily collar could be discerned. Flavour and taste were judged to be excellent and devoid of any fish like odours.

EXAMPLE 4

In the previous examples the bulk of the oil was heated to 70° C. to ensure complete dissolution of the emulsifiers and the suspension stabilizing material. In the present example, however, the emulsifiers and the fully hardened fish oil used in Example 3 were dissolved in only 1.5 kg fully refined sunflower oil and this solution was then added to the warm (45° C.) remainder of the base oils. This modification of the process led to identical results.

EXAMPLE 5

Similarly the browning substance was added to a small aliquot (1 kg) of the oil and added to the bulk of the oil prior to the rapid cooling step; again the results were identical.

EXAMPLE 6

The use of a Votator-type chill cooler is not an essential part of the invention. In this example, a premix of 0.25 kg fully hardened fish oil, 0.1 kg of 40% monoglycerides and 0.1 kg of lecithin were dissolved in 2 kg safflower oil at 65° C. and mixed with a dispersion of 0.5 kg spray dried product as described in Example 1 in 1.0 kg of safflower oil. The percentage weight of the stabilizing material was again 0.75%.

The mixture was slowly added under vigorous agitation to 30 kg safflower oil that had been cooled to −5° C. in a deep-freeze. Because of the mechanical energy supplied by the agitator (Ultra Turrax), the temperature of the oil rose to 2° C., and a stable suspension resulted that did not show any noticeable oil separation for at least two weeks and that could be poured over a wide temperature range. Because, however, the vigorous agitation had caused a fair amount of air to the whipped into the product, some of the air bubbles rose to the neck of the bottle during storage.

Thus, a 2 l sample of the product was poured into a 5 l round bottom flask which was slowly evacuated to an ultimate vacuum of 1 mm Hg over a period of 45 min. After slowly breaking the vacuum, a frying oil resulted that was completely free from visible air bubbles.

EXAMPLE 7

Since the frying oil prepared in Example 3 also contained some air bubbles, the process as described in Example 3 was modified in that the mixture was degassed by evacuation prior to being fed to the Votator. Again, no air bubbles could be discerned in the final product and its stability and frying performance were unaffected.

EXAMPLE 8

The use of a spray dried mixture as a combination of browning substance and flavouring ingredients is not essential to the present invention. Thus in the present example the process as described in Example 3 was used but instead of the spray dried product 0.2 kg of skimmed milk powder, 0.1 kg salt and 0.05 kg of flavours were added to the oil prior to its being cooled. The hardened fish oil proved to be an excellent suspension stabilizer also for these ingredients in that after three weeks storage at room temperature no separation was noticeable. On frying, the frying oil composition behaved slightly different in that the browning substance had a somewhat coarser appearance but taste, flavour of oil and sauce were otherwise unaffected.

EXAMPLE 9

The skimmed milk powder used in the spray dried product or as such need not be the single source of browning substance. Thus in the present example the process of Example 8 was repeated but instead of the hardened fish oil, 0.25 kg fully hardened rapeseed oil (slip melting point 62° C., iodine value less than 1) was used and 0.2 kg of whey powder was used as a browning agent. Thus both the stabilizing material and the browning material were present at 0.75 wt % level.

No oily collar could be discerned after three weeks storage at room temperature and all other properties evaluated were found to be fully acceptable.

EXAMPLE 10

Similarly, the browning substance need not be derived from cow's milk. Thus spray dried soy bean milk was used instead at a level of 0.2 kg on 33 kg of oil. The suspension stabilizer used in this example was 0.35 kg of fully hardened palm oil (slip melting point 60° C., iodine value less than 1). The process used was according to Example 1. Suspension stability was considered to be fully satisfactory in that no oily layer appeared during the first week of storage. Because of the fairly high level of stabilizing substance used (1 wt %) the resulting frying oil was rather thickly viscous and not quite uniform in thickness. On use the frying oil showed a rather dark browning substance of a pleasant taste and flavour.

EXAMPLE 11

A frying oil was made according to Example 1 with the omission of the emulsifiers. Although the resulting frying oil composition exhibited good stability and flavour, the resulting sauce showed no stability at all and during the frying of the meat more than 150 spots were observed on the paper. The use of just 0.1 kg of lecithin somewhat improved the stability of the sauce but hardly affected the spattering behaviour.

EXAMPLE 12

In the previous examples, the partially or fully hydrogenated stabilizing materials used, were derived from single oils. Thus in this example, using the process described in Example 1, a mixture of 0.15 kg fully hardened rapeseed oil and 0.15 kg fully hardened fish oil was used giving a stabilizing material concentration of 0.9 wt % leading to an excellent stability of no separation for three weeks.

EXAMPLE 13

In this example an interesterfication mixture of 30% fully hardened palm oil and 70% fully hardened fish oil was used at a level of 0.75 wt %. Again excellent suspension stability was observed and other properties were unaffected by the use of the interesterfication mixture.

What we claim is:

1. An edible oil composition suitable for frying uses consisting essentially of
   (a) a liquid edible oil,
   (b) an emulsifier present in an amount of 0.2 to 2 percent by weight of said composition,
   (c) a browning substance present in an amount of 0.1 to 1.5 percent by weight of said composition, and
   (d) a stabilizing material in an amount effective so as to prevent or reduce the separation of the components of said composition and forming 1 weight percent or less of the total weight of said composition, said stabilizing material being a fully or partly hardened fat or oil having a slip melting point of at least 45° C.

2. The edible oil composition of claim 1 wherein said stabilizer is selected from the group consisting of hardened rape seed oil, hardened fish oil, hardened groundnut oil and partly hardened sunflower oil.

3. The edible oil composition of claim 1 wherein said browing substance is selected from the group consisting of milk powder, defatted milk powder, whey powder and dried buttermilk.

4. An edible oil composition suitable for frying uses consists essentially of
   (a) a liquid edible oil,
   (b) an emulsifier present in an amount of 0.2 to 2 percent by weight of said composition,
   (c) a browning substance present in an amount of 0.1 to 1.5 percent by weight of said composition, said browning substance being selected from the group consisting of milk powder, defatted milk powder, whey powder and dried buttermilk, and
   (d) a stabilizing material in an amount effective so as to prevent or reduce the separation of the components of said composition and forming 1 weight percent or less of the total weight of said composition, said stabilizing material having a slip melting point of at least 45° C. and being selected from the group consisting of hardened rape seed oil, hardened fish oil, hardened groundnut oil and partly hardened sunflower oil.

5. A process for preparing the composition of claim 1 comprising dissolving the emulsifier and stabilizing material in a portion of said liquid edible oil, blending the remaining components of said composition in the resulting solution and rapidly cooling the resulting composition with agitation.

6. A process for preparing the composition of claim 1 comprising dissolving the emulsifier and stabilizer material in a first portion of the liquid edible oil, suspending the browning substance in a second portion of said liquid edible oil and admixing said first and second portions with a third portion of said liquid edible oil.

7. The process of claim 6 wherein said third portion of liquid edible oil comprises at least 80 weight percent of the composition and wherein said third portion is cooled to below 10° C. prior to admixture with said first and second portions.

* * * * *